United States Patent Office 3,311,663
Patented Mar. 28, 1967

3,311,663
NON-CRYSTALLINE HALO-ARYL SULFIDES
Marcel E. Degeorges, Lyon, and Yolande Bourgau,
Neuville-sur-Saone, France, assignors to Society Progil,
Paris, France
No Drawing. Filed Dec. 26, 1962, Ser. No. 247,007
Claims priority, application France, Dec. 30, 1961,
883,586
6 Claims. (Cl. 260—608)

The present invention relates to a new type of halo-aryl sulfide, and more especially polysulfides, notably polychlorophenyl polysulfides. It also concerns a new process for the preparation of these substances.

Few halo-aryl sulfides have hitherto been isolated, and those which are known are in crystalline form and are insoluble or sparingly soluble in the majority of hydrocarbons, notably in lubricating oils. This is the case with 2,2'-4,4'-5,5'-diphenyltrisulfide, which is a known crystalline substance, M.P. 163–164° C.

With regard to the preparation of such substances, the prior art consists in treating trichlorobenzene with sulfur monochloride in the presence of a large excess of a catalyst of the Friedel-Crafts type, at relatively low temperature, generally not exceeding the ambient temperature. The excess of catalyst is necessary in order to obtain the disulfide, because without it the reaction gives mainly the monosulfide.

The present invention is based upon the discovery of a new type of halogenated aryl sulfides which differ distinctly from the hitherto known products by their resinous state and their solubility even in the cold in various aromatic and aliphatic hydrocarbons, even of very heavy form, and more especially in oils and naphthenic solvents.

Sulfides of this novel type include various polyaryl polysulfides, of which one or more aromatic nuclei are halogenated, which nuclei may carry side chains containing, where appropriate, also halogens and other substituents. Particularly important products from the industrial viewpoint are polysulfides of chlorophenyls and above all of polychlorophenyls. Thus, for example, highly interesting products are polysulfides of bis-trichlorophenyl, bis-tetrachlorophenyl and bis-pentachlorophenyl, having chlorine contents between 45% and 55% by weight and sulfur contents from 15% to 25%. The main resinous products according to the invention contain from 46% to 51% of Cl and from 18% to 21% of S.

In contradistinction to the insoluble or sparingly soluble crystalline substances having distinct melting points of the prior art, the new products are suitable, by virtue of their solubility and their particular structure, for various applications, for example as insecticides, fungicides, vulcanization accelerators, lubricating compositions, cutting oils, polymers, intermediate materials in the preparation of chlorothiophenolsulfuric or chlorothiophenolsulfonic acids, chlorinating agents, etc. Owing to their high chlorine and sulfur contents, the new products may be employed in various cases where it is desired to introduce chlorine or sulfur in stable form into a molecule. From the economic viewpoint, the new products according to the invention are highly advantageous, because their preparation is inexpensive and cheap starting materials are employed therein.

The process according to the invention consists in preparing the new resinous polyaryl polysulfides by heating the corresponding crystallizable polysulfides. Preferably, the heating takes place in the presence of a catalyst of the Friedel-Crafts type.

Depending upon the nature of the substance to be heated, the heating may require a more or less high temperature and a more or less long duration. Specifically, it may be necessary to maintain the substances between 80° and 250° C., and preferably between 85° and 210° C., for a number of hours, for example from 1 to 12 hours.

An improved embodiment of the invention consists in carrying out the heating of the polyhalo-aryl polysulfide in the nascent state, that is to say, during its very preparation. It is then possible to work at moderate temperatures and to control the reaction more conveniently. This procedure comprises reacting sulfur monochloride $S_2Cl_2$ or another chlorosulfane with an excess of a halo- or polyhalo-benzene, in the presence of a Friedel-Crafts catalyst, at a temperature from 10° to 150° C. for the period necessary for the condensation of $S_2Cl_2$ with the halo-aryl, that is, generally for one or several hours.

Thus, the preparation may take place at higher temperature than in the prior art, and there need not be a large excess of catalyst. In accordance with the invention, there may be employed proportions of catalyst, for example $AlCl_3$, ranging from 0.5% to 150% of the weight of $S_2Cl_2$ employed.

In accordance with one embodiment of the invention, the preparation is carried out between 20° and 50° C., but before the product obtained is separated from the reaction medium the latter is heated to a higher temperature, preferably of the order of 85° C. This heating generally lasts several hours, and it is followed by a separation which consists in treating the mixture with water in order to destroy the catalyst, in neutralizing the organic phase formed and in distilling the excess of polyhaloaryl or -aryls.

This heating affords the advantage that it renders the solutions of resinous polysulfides more stable in their solvents, since the aforesaid further heating at about 85° C. avoids the ultimate formation of deposits in the solutions of the polysulfide in aromatic solvents or oils.

In the particular case in which the present invention is applied to the preparation of new resinous bis-trichlorophenyl polysulfide, the various catalysts of the Friedel-Crafts type, such as $ZnCl_2$, $FeCl_3$, $AlCl_3$, etc., may be employed. Aluminum chloride is particularly suitable and its proportion may vary between 0.5% and 150% by weight calculated on the proportion of $S_2Cl_2$ employed, but the best results are obtained with 0.5% to 30%, and preferably with 2% to 20%, of $AlCl_3$ calculated on the sulfur chloride. The preferred temperature range for the first phase of the operation is from 40° to 110° C. It is higher as the proportion of catalyst is lower, and vice versa. The reaction mixture is thereafter maintained for 1 to 10 or, preferably, for 2 to 5 hours, at a higher temperature located between 80° and 180° C. The products thus prepared are more soluble and give solutions which are more stable in time, than the products obtained at lower temperatures.

Preferably, the crude product obtained in accordance with the invention, after elimination of the catalyst in the aqueous phase, is subjected to distillation for the purpose of separating the excess of halo-aryl, specifically polychlorobenzene. An important feature consists in effecting this distillation under a reduced pressure such that the final temperature of the product reaches at least 90° C., or better still 110° C., and advantageously up to 210° C.

In accordance with a variant, when products having a higher sulfur concentration are to be prepared, the resinous polysulfide obtained by the aforesaid process is heated with an additional quantity of sulphur in a subsequent operation, or during one of the operating phases, notably that at about 85° C., or during the distillation of the excess of polyhalo-aryl. The heating of the finished product with sulfur preferably takes place at temperatures from 150° to 200° C. for 1 to 10 hours and preferably for 2 to 4 hours. The additional quantity of sulfur may be, for example, 1% to 30% of the weight of the mixture.

In accordance with an advantageous embodiment, the resinous polysulfides are prepared from trihalo-aryls—notably trichlorobenzenes—to which has been added a substantial proportion of tetra- and/or pentahalo-aryls, more especially tetra- and/or pentachlorobenzene. The resultant polysulfides have a higher halogen content, for example up to 55% of Cl, and their solutions in various oils are more stable than those of the trihalogenated compounds alone.

Particularly favorable results are obtained when the trichlorobenzene employed in the preparation of the resinous polysulfides contains a proportion of 1,2,3-isomer in the neighborhood of, or preferably equal to, that of the 1,2,4-isomer.

The new resinous products according to the invention may be obtained from crystalline halo-aryl polysulfides by heating halo-aryls in the absence of catalysts, optionally in a liquid such as an oil or another heavy solvent for the resinous product to be formed. It is then necessary to bring the product to a temperature of 85-230° C. for a period which is longer in proportion as the temperature is lower. It is generally observed that, with equal temperature and equal duration, the resin obtained is less soluble than if it is obtained in the presence of the catalyst and above all from the condensation medium itself.

When a resinous product prepared by any of the described methods has insufficient solubility and/or stability in solution, it is possible to improve these properties by subsequent heating, with or without catalyst. It is possible to carry out this operation in the presence of a solvent for the product. The halo-aryls themselves are particularly suitable for this purpose.

Generally speaking, concentrated solutions of resinous polysulfides according to the invention may be prepared for various applications by mixing, eventually in the heat, the more or less resinous product with various liquids which dissolve the resin, such as, for example, petroleum oils, notably lubricating oils, naphthenic oils, diphenyl, diphenyl oxide, trichlorobenzenes or mixtures thereof with tetrachlorobenzenes, chlorinated diphenyls, dodecylbenzenes, terphenyls, decalin, higher alkyl-benzenes, etc.

Although it is possible by the application of the preferred form of the invention to obtain products whose solutions in various solvents have good stability, the latter may also be obtained by the addition of amines to these solutions. Preferably, amines are employed which are not too volatile, such as, for example, aliphatic amines, such as triethylamine, ethanolamines, for example triethanolamine, anilines such as dimethyl or diethyl anilines, cyclohexylamine, etc.

In order to illustrate the invention, a number of non-limiting examples thereof are given in the following. In these examples, the abbreviation TCB has been employed to denote trichlorobenzene. The examples refer to the use of this substance, but it is to be understood that the invention may be carried out with other halogenated aromatic compounds, and that the nature and number of halogen atoms in each of the aromatic molecules may vary. The chlorinated compounds may more especially be replaced by bromo derivatives. It is possible to replace all or part of the benzene by one or more homologous hydrocarbons such as toluene, xylene, mono- or polyethyl, propyl, butyl, isobutyl, phenyl or dodecyl benzenes or others. Naphthenic indenic, anthracenic or other nuclei may also partly or entirely replace the benzenic nucleus. On the other hand, mixed products are obtained when starting with mixtures of a number of mono- or polyhalo-aryls. More especially, it is possible to subject to the reaction with sulfur halide or another halosulfur, for example $S_2Br_2$, a mixture of mono- di-, tri- and tetra-halo-benzenes. It is also possible to start with a mixture of a number of halogenated aromatic derivatives, for example chlorobenzenes with chlorinated ethylbenzenes, chlorinated diphenyls or polyphenyls, chlorinated naphthalenes, etc. It is also possible to employ in combination halogenated or non-halogenated aromatic derivatives, for example chlorobenzenes with diphenyl, etc. Where appropriate, the chlorosulfanes may be replaced by substances capable of liberating chlorosulfanes in the nascent state, or by solutions of free sulfur in a chlorosulfane, or by any other equivalent reactant.

Although the chemical structure of these compounds is not yet well established, it is probable that the compounds may be represented, at least approximately, by the following formula:

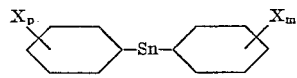

wherein X is an halogen; the numbers of halogens $m$ and $p$ are, of course, integers and they may vary from 1 to 5; they are more often than not equal to 3 or 4. While $m$ may equal $p$, one of the numbers could eventually be zero, in which case one of the two aryl nuclei of the above formula has no halogens. As to the number $n$ of S atoms, it may vary but it is generally of the order of 3.

By way of possible examples only, the following compounds could be present in polysulfides obtained from trichlorobenzene:

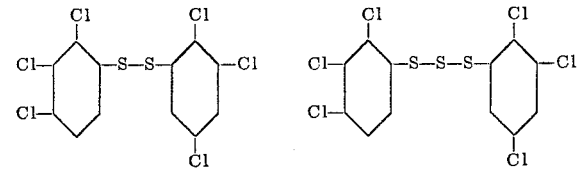

Example 1

To 1089 g. (6 moles) of industrial TCB and 36 g. of $AlCl_3$ heated at 45° C. with stirring are gradually added in 2 hours 206 g. of $S_2Cl_2$ previously diluted with 726 g. (4 moles) of TCB. The TCB employed contains by weight:

| | Percent |
|---|---|
| 1-2-3-trichlorobenzene | 30 |
| 1-2-4-trichlorobenzene | 65 |
| 1-2-4-5- and 1-2-3-4-tetrachlorobenzenes | 5 |

When the addition of sulfur monochloride is complete, the stirring is maintained for a further hour at 45° C., whereafter the mixture is poured on to crushed ice. The product is washed a number of times with lukewarm water until the catalyst is completely destroyed. The organic solution formed is decanted and then distilled under a reduced pressure of 11 mm. Hg, until the temperature of the distillation vessel reaches 195-200° C. By this distillation, 1280 g. of the excess of TCB are recovered. The residue consists of 547 g. of a chlorophenyl polysulfide resin containing 47.9% by weight of chlorine and 18.4% by weight of sulfur. This composition is intermediate between that of the di- and tri-sulfides of bis-trichlorophenyls. The resin obtained is soluble in various solvents and more especially in paraffinic hydrocarbons, notably petroleum oils.

Example 2

To 817 g. (4.5 moles) of the same TCB as in Example 1 are added 20 g. of $AlCl_3$ with stirring, and the mixture is heated at 45° C. There are gradually added to the mixture in about 2 hours 405 g. of $S_2Cl_2$ previously diluted with 363 g. (2 moles) of TCB. When the reaction is complete, the mixture is brought to 80° C. and this temperature is maintained for 2 hours. The product is then degassed with nitrogen and cooled, whereafter the greater part of the catalyst is destroyed by washing with iced water. The last traces of catalyst are removed by washing with 5% HCl, followed by a treatment with a 5% aqueous solution of $Na_2CO_3$. The product obtained is finally washed with water, all these washing operations taking place at about 40–50° C. The organic portion is then decanted and the remaining TCB is distilled under reduced pressure—10–12 mm. Hg—until the temperature reaches 200° C. in the distillation vessel. There are thus recovered 327 g. of TCB and there remain 1007 g. of resinous polysulfides having a chlorine titer of 49.6% and a sulfur titer of 19.2%.

This resinous product is soluble up to high concentrations in various aromatic and aliphatic, saturated and unsaturated, alicyclic and naphthenic solvents, and more especially in the petroleum oils employed as lubricants. These solutions remain stable in the course of time.

*Example 3*

After a series of operations identical to those of Example 1, the resin obtained is heated at 200–210° C. under a pressure reduced to 13 mm. Hg, for 1 hour. There are thus obtained 542 g. of a resin containing 46.4% of chlorine and 18.9% of sulfur. The solutions of this product in various solvents, and more especially in cutting oils, have better stability than the resin obtained in accordance with Example 1.

*Example 4*

A preparation identical to that of Example 2 is performed, starting with a TCB containing:

| | Percent |
|---|---|
| 1,2,3-trichlorobenzene | 29.7 |
| 1,2,4-trichlorobenzene | 64.3 |
| Dichlorobenzenes | 6 |

*Example 5*

In a preparation identical to that of Example 2, there were initially employed

| | Percent |
|---|---|
| 1,2,3-trichlorobenzene | 26.8 |
| 1,2,4-trichlorobenzene | 58.2 |
| Tetrachlorobenzenes | 15 |

*Example 6*

To a mixture of 500 parts by weight of 1,2,3-TCB
500 parts by weight of 1,2,4-TCB
94 parts of 1,2,3,4-tetrachlorobenzene
12 parts of 1,2,4,5-tetrachlorobenzene
5 parts of pentachlorobenzene, heated at 45° C. with stirring, with 20 parts of anhydrous $AlCl_3$ as catalyst, are gradually added in 45 minutes 405 parts of sulfur chloride. When the reaction is complete, the reaction mixture is heated at 85° C. for 2 hours. This mixture is then degassed by the passage of a current of nitrogen and then washed with water to destroy the catalyst. The last traces of the latter are thereafter removed by washing with 5% HCl at 50° C., whereafter the product is washed with a dilute alkaline solution, notably an approximately 5% aqueous $Na_2CO_3$ solution, and finally with water until neutrality. The organic layer present is decanted from the aqueous layer and distilled under a pressure of 20 mm. Hg until the temperature of the distillation vessel reaches 200° C., i.e. for 1 hour 45 minutes.

In the course of this distillation, 250 parts by weight of polychlorobenzenes are recovered, and there remain 950 parts of resinous polysulfides containing:

| | Percent |
|---|---|
| Chlorine | 50.6 |
| Sulfur | 19.6 |

This resin has a good solubility in various lubricating oils, both of paraffinic and other natures, as may be seen from the table of Example 8 given in the following. It also has the infra-red spectrum reproduced on the accompanying graph, as also the following characteristics:

Density at 90° C. _____ 1.632
Viscosity:
    At 56° C. _____poises__ 54.5
    At 80° C. _____do____ 3.22
    At 131° C. _____do____ 0.265
Pour point, according to the standard A.S.T.M.
    D97–47 _____° C__ 43.8

As will be seen, the product gradually changes to the liquid state from 43.8° C—similarly to resinous materials—while the known crystalline 2,2′-4,4′-5,5′-hexachloro-diphenyl disulfide and trisulfide have distinct melting points of 142–143° C. and 163–164° C. respectively.

*Example 7*

In an operation similar to that of Example 6, the reaction mixture contains only 10 parts of $AlCl_3$ and it is maintained at 65° C. instead of 45° C. during the addition of $S_2Cl_2$, which lasts 1 hour. Heating is thereafter effected at 100° C. for 4 hours instead of at 85° C. for 2 hours. When the operation is complete as in Example 6, there are finally collected 290 parts of polychlorobenzenes, while there remain 850 parts of resinous product which is distinctly more viscous than the preceding one, as shown by the following measurements:

| | Poises |
|---|---|
| Viscosity: | |
| At 56° C. | 173 |
| At 80° C. | 5.7 |
| At 131° C. | 0.68 |

This resin is distinctly soluble in petroleum oils, naphthenic oils, chlorinated diphenyls, etc.

*Example 8*

Starting with crystalline hexachlorodiphenyl trisulfide $(C_6H_2Cl_3)_2S_3$ having a melting point of about 163–165° C., a resinous product was prepared by direct heating of the said compound in the absence of catalyst. The resultant product, the initial crystalline compound and the resins prepared according to Examples 1 to 6 were tested from the viewpoint of their solubilities in four known commercial oils, of which the brands are indicated. The following table indicates the approximate solubilities in percentage by weight.

| | | "100 Neutral" | "350 Neutral" | "Progiline" | Napththenic "Spindle" |
|---|---|---|---|---|---|
| I | Crystalline hexachlorodiphenyl-sulfide. | <0.5 | <0.5 | <0.5 | 0.5. |
| II | Crystalline hexachlorodiphenyl-sulfide after heating for 10 hours at 200° C. (molten). | 3 to 5 | 3 to 5 | 7 to 10 | 7 to 10. |
| III | Resinous product of Example 1. | 15 | 40 | In all proportions. | In all proportions. |
| IV | Resinous product of Example 6. | 20 | 50 | do | Do. |

On the other hand, a product prepared as in Example 2, but without exceeding 80° C. at any instant, that is to say, without final heating at 200° C., had very low solubility, between those of I and II.

Example 9

Stability tests were applied to solutions of the resinous products, leaving the solutions, like those of Example 8, at room temperature for some time.

It was found that solution II became cloudy after several days and gave rise to the formation of deposits.

This also occurred, but after a much longer time, with solutions III and even later with IV.

The precise comparison between III and IV was made on solutions containing 80% by weight of resin in oil known under the name "spindle oil" (naphthenic). In this case, in:

III—a deposit was formed after 30 days, and
IV—there was neither cloudiness nor deposit after 90 days.

Example 10

To 1000 g. of resinous polysulfides prepared as in Example 1 are added 50 g. of a TCB mixture containing 75% of 1,2,4-isomer with 25% of 1,2,3-isomer, as also 5 g. of anhydrous $AlCl_3$. The whole is heated between 140° and 150° C. for half an hour. After cooling, the product is washed in the usual way to remove the catalyst. The water and the greater part of TCB are distilled under reduced pressure, the temperature being brought to 180° C. The residue consists of 930 g. of resin soluble in oils, giving more stable solutions than the resinous product of Example 1.

Example 11

When 800 g. of polysulfides of polychlorobenzenes, prepared in accordance with Example 1, had been mixed with 200 g. of trichlorodiphenyl, the whole was heated for 2 hours at 200° C. The clear liquid thus obtained was particularly readily soluble in oils.

Example 12

800 g. of resinous product, obtained in Example 1, and mixed with 200 g. of naphthenic oil known under the name "Spindle" were heated at 190° C. for 10 hours. The residual solution remained clear for more than 2 months and could readily be diluted with oil to give more stable solutions than those of the product of Example 1 which had not undergone any further heating.

Example 13

To 65 parts of lubricating oil, commercially known under the name "Progiline" were added 35 parts of resinous polysulfide obtained in accordance with Example 6, and the whole was heated for 5 hours at 120° C. A viscous liquid was thus formed which could readily be diluted in an excess of oil to give solutions stable in time.

Example 14

The procedure of Example 6 was applied to an initial mixture composed only of TCB without any tetra- or pentachlorobenzene. The resinous product obtained then contained 47.1% of Cl and the stability of the solutions in oils was substantially mid-way between those of products III and IV of Examples 8 and 9.

Example 15

By applying the technique of Example 6 to tri- and tetrachlorotoluenes instead of polychlorobenzenes, resinous products similar to those of Example 6 are obtained, of which the composition is mid-way between that of the disulfide and the trisulfide of hexachloroditolyl.

Example 16

Example 1, in which the polychlorobenzenes were replaced by the corresponding polybromobenzenes, gave a resinous product soluble in oils. However, this product costs much more owing to the great difference between the prices of chlorine and bromine.

Example 17

In the general procedure of Example 6 there is used only 1.5% of $AlCl_3$ with respect to the weight of $S_2Cl_2$. The latter is introduced at 70° C. during 2 hours, and then temperature is raised and kept at 100° C. for 2 hours. After a further elevation of temperature and maintaining it at 120° C. for 4 hours, the reaction mixture is washed and neutralized in usual manner.

Then, instead of distilling as mentioned in Example 6, the product obtained is merely dried; it is constituted by a solution of about 74% of halo-phenyl polysulfide in the initial halo-aryls. This mixture is miscible in all proportions with oils, especially petroleum oils, and particularly those of Example 8.

What we claim is:

1. A process for the preparation of a non-crystalline, substantially solid polychlorophenyl polysulfide which does not crystallize when cooled from its liquid state to below its solidification temperature and which is soluble in oils, which comprises reacting at least one polychlorobenzene with sulfur monochloride at temperatures within the range of from 10° to 150° C. to produce the corresponding crystalline polychlorophenyl polysulfide by condensation; heating the reaction mixture at temperatures within the range of from 80° to 250° C. for from 1 to 12 hours to convert the crystalline polysulfide to said non-crystalline polychlorophenyl polysulfide; and separating said non-crystalline polychlorophenyl polysulfide from the reaction mixture by distillation.

2. The process for the preparation of a non-crystalline polychlorophenyl polysulfide, as defined in claim 1, in which said polychlorobenzene is a material selected from the group consisting of the dichlorobenzenes, and trichlorobenzenes and the tetrachlorobenzenes.

3. The process for the preparation of a non-crystalline polychlorophenyl polysulfide, as defined in claim 1, in which the polycholorbenzene and sulfur monochloride are reacted in the presence of at least 0.5%, by weight of the sulfur monochloride, of a Friedel-Crafts catalyst; and in which the resulting reaction mixture is then heated for from 1 to 12 hours at higher temperatures, within the range of from 80° to 180° C., to convert the crystalline polysulfide thus produced to said non-crystalline polychlorophenyl polysulfide.

4. A process for the preparation of a non-crystalline, substantially solid polychlorophenyl polysulfide which does not crystallize when cooled from its liquid state to below its solidification temperature and which is soluble in oils, which comprises:

(a) mixing at least one polychlorobenzene selected from the group consisting of the dichlorobenzenes, trichlorobenzenes, and tetrachlorobenzenes, with sulfur monochloride, in admixture with from 0.5% to 150%, by weight of the sulfur monochloride, of an anhydrous aluminum chloride catalyst;

(b) heating the mixture at temperatures within the range of from 10° to 150° C., the temperature varying inversely with the proportion of the aluminum chloride catalyst present, to condense the polychlorobenzene and sulfur monochloride and thereby produce a crystalline polychlorophenyl polysulfide;

(c) heating the reaction mixture containing the crystalline polychlorophenyl polysulfide at higher temperatures, within the range of from 80° to 180° C., for periods of from 1 to 12 hours to convert the crystalline polychlorophenyl polysulfide to said non-crystalline polychlorophenyl polysulfide;

(d) washing the reaction mixture with water to remove the anhydrous aluminum chloride catalyst; and (e) distilling the reaction mixture under reduced pressures and at temperatures within the range of from 100° to 250° C. to distill off the unreacted polychlorobenzenes and recover said non-crystalline polychlorophenyl polysulfide.

5. The process for the preparation of a non-crystalline polychlorophenyl polysulfide, as defined in claim 4, in which the reaction mixture containing said non-crystalline, substantially solid polychlorophenyl polysulfide is heated in admixture with from 1% to 30%, by weight of said mixture, of sulfur.

6. A non-crystalline substantially solid bis-polychlorophenyl polysulfide which does not crystalize when cooled from its liquid state to below its solidification temperature and which is soluble in lubricating oils, prepared by:
(a) reacting a polychlorobenzene selected from the group consisting of the dichlorobenzenes, trichlorobenzenes, and tetrachlorobenzenes, with sulfur monochloride at temperatures of from 10° to 150° C.;
(b) heating the reaction mixture for from 1 to 12 hours at higher temperatures, within the range of from 80° to 180° C.;
(c) washing the reaction mixture with water; and
(d) distilling the reaction mixture to separate the bis-polychlorophenyl polysulfide.

References Cited by the Examiner
UNITED STATES PATENTS

| | | | |
|---|---|---|---|
| 2,695,898 | 11/1954 | Lober et al. | 260—608 |
| 2,947,730 | 8/1960 | Holly et al. | 260—79.7 |
| 2,947,731 | 8/1960 | Nummy | 260—79.7 |

JOSEPH L. SCHOFER, *Primary Examiner.*

HARRY WONG, *Assistant Examiner.*